United States Patent Office 3,329,814
Patented July 4, 1967

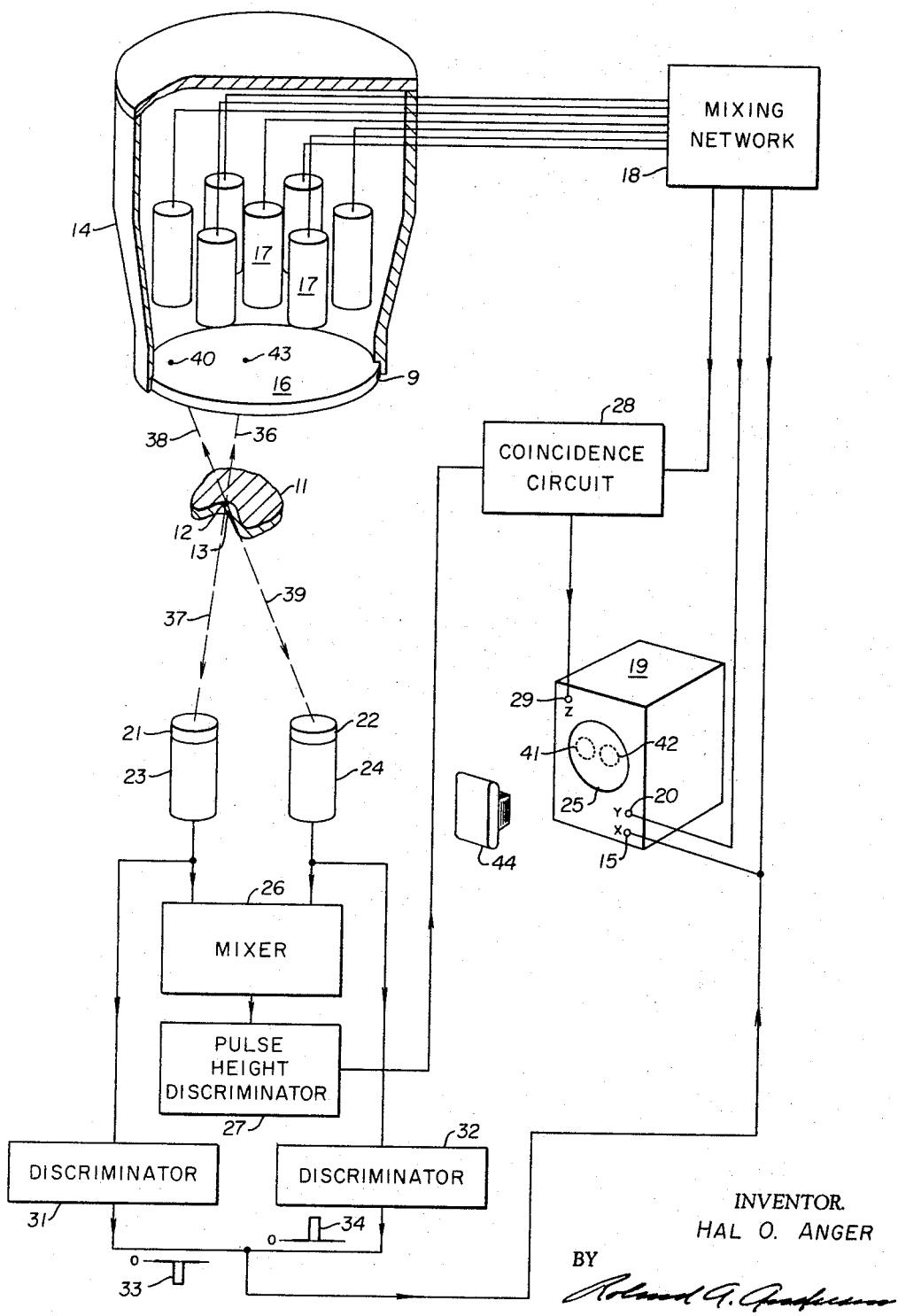

3,329,814
STEREO POSITRON CAMERA FOR DETERMINING THE SPATIAL DISTRIBUTION OF RADIOACTIVE MATERIAL IN A TEST BODY
Hal O. Anger, Oakland, Calif., assignor to the United States of America as represented by the United States Atomic Energy Commission
Filed Feb. 23, 1965, Ser. No. 434,725
9 Claims. (Cl. 250—61)

This invention relates to apparatus for detecting charged nuclear particles and more particularly to a positron camera for accurately determining the spatial distribution of radioactive material in the human body and the like.

A prior form of positron camera is described in the periodical "Nucleonics" published by McGraw-Hill Publishing Co., October 1963, volume 21, Number 10, pages 56–59. Such a radiation detecting camera is used, for example, to detect and accurately locate a tumor in a patient. Typically, a positron emitting substance such as Gallium 68 EDTA, which tends to accumulate in certain types of tumors, is introduced into the patient. After the radioactive substance has been accumulated in the tissue of interest, the emitted positrons will give rise to radiations which may be indicative of the location, configuration and other characteristics of the tissue. Specifically, when a positron is annihilated by combining with an electron, two 0.51 million electron volt gamma rays are produced which travel in opposite directions. In the positron camera, gamma ray detectors are disposed on opposite sides of the portion of the patient to be examined to indicate the relative intensity of radioactivity in various portions of the region viewed by the camera. Such an image may provide valuable assistance in diagnosing and treating tumors or other medical conditions in a patient.

The present invention provides superior results relative to prior cameras of this type in that stereoscopic images are formed so that the position of a radioactive region in a patient is accurately determinable in three dimensions. Such stereo images are obtained with a single camera and accompanying decoding system.

It is an object of the present invention to provide an improved radiation detecting camera.

It is another object of the present invention to provide a means for more accurately determining the spatial position and configuration of a radioactive region.

It is another object of the present invention to improve the accuracy of diagnosis for various physiological conditions in a patient.

It is another object of the present invention to produce simultaneous stereo images of a positron releasing substance.

It is another object of the present invention to obtain stereo images of a positron emitting substance conveniently and relatively inexpensively by utilizing a single radiation camera.

The invention will be better understood by reference to the accompanying drawing which is a block circuit diagram of a stereo positron camera with certain structural elements thereof shown schematically.

Before a stereo image is obtained, in a typical usage of the camera a positron emitting substance with an affinity for the type of tissue being investigated is injected into the subject. Arsenic 71 in the form of sodium arsenate, for example, will tend to accumulate in brain tumors, while fluorine 18 will accumulate in bones. After the substance has been accumulated in the tissue, the subject is observed by a positron camera as in the present invention. As an example, in the drawing, a portion 11 of the subject is indicated including two small areas 12 and 13 where the positron emitting substance is concentrated. Areas 12 and 13 might typically be spaced apart.

Considering now the structure of the camera, a thick lead camera housing 14 has an opening 9 across which a disc 16 of scintillation material is disposed. The scintillator 16 faces the subject 11 to intercept gamma rays resulting from annihilation of positrons at areas 12 and 13. For instance, gamma ray 38 intercepted by the scintillator 16 causes a momentary spot of light 40 therein. A two-dimensional array of phototubes 17 within the camera housing 14 views the scintillator 16, each phototube producing an output pulse having an amplitude proportional to the quantity of light received. The phototubes 17 may be disposed in any of various configurations for viewing the scintillator 16. Preferably, however, six phototubes are equally spaced in a circle around a center phototube, as shown in the figure. The electrical output pulses from the phototubes 17 are combined in a resistive mixing network 18 to provide three different camera signals: an X signal and a Y signal each having amplitudes proportional to the corresponding rectangular coordinates of the location of a spot of light in the scintillator 16, and a summation signal having an amplitude corresponding to the intensity of the light spot. The summation signal thus is proportional to the energy of the intercepted gamma ray. The X position signals are obtained by comparing in the mixing network 18 the amplitudes of the output signals from phototubes on the left side of the array with phototubes on the right side. That is, if a spot of light occurs near one side of the scintillator 16, the resultant phototube pulses from the nearby phototubes will have a higher amplitude than those further away from the spot of light. Likewise, Y position signals are obtained by comparing signals from phototubes at the front of the array with those at the back. The summation signal is a mixture of the signals from all the phototubes 17. A typical mixer and phototube array suitable for use in the present invention is shown and described in more detail, including specific mixer circuitry, in the periodical "Review of Scientific Instruments," volume 29, Number 1, January 1958, by Anger, pages 27–33.

The X and Y signals are applied to the X and Y (horizontal and vertical deflection) signal terminals 15 and 20 of an oscilloscope 19 and provide positioning control for the electron beam therein so that a spot of light may be produced on the oscilloscope screen 25 in a position corresponding to the position of the original spot of light on the scintillator 16.

Apparatus as described above functions as a location detector for a gamma ray. However, it is necessary to derive another signal which in effect provides collimation of the image. The collimation is provided by detecting a portion of the second oppositely-directed gamma rays resulting from the positron annihilations. For this purpose, a pair of spaced apart left and right scintillators 21 and 22, are disposed on the opposite side of subject 11 and are viewed by collimating photomultiplier tubes 23 and 24 respectively. The positioning of the scintillators 21 and 22 is analogous to the positioning of a pair of eyes, the positioning determining the view points of the resultant stereo images. A gamma ray passing through the left scintillator 21 will cause a light flash therein which is detected by the left photomultiplier tube 23 and an electrical output pulse is produced. Such electrical pulse is applied to a mixer circuit 26 which also receives similarly produced pulses from the right photomultiplier 24. Ordinarily, a pulse is received from only one of the photomultipliers 23 and 24 at a time. Pulses out of the mixer 26 are applied to a pulse height discriminator 27 which passes only pulses above a pre-set amplitude level, such amplitude level being slightly below the level of an input signal resulting from a gamma ray of the desired energy striking one of the scintillators 21 or 22. Thus extraneous low-level signals may be eliminated.

Further discrimination against extraneous signals is provided by applying signals out of the pulse height discriminator 27 to one input of a coincidence circuit 28. The summation signal from the mixing network 18, previously described, is applied to the second input of the coincidence circuit, thus an output pulse from the coincidence circuit can only occur when a signal is simultaneously produced in the phototubes 17 and one of the phototubes 23 and 24. Since most stray radiation will not result in simultaneous signals being applied to both the inputs of the coincidence circuit, the coincidence circuit is effectively a filter for suppressing response to stray radiation.

Output pulses from the coincidence circuit are applied to a Z or beam intensity terminal 29 of the oscilloscope 19, the electron beam in the oscilloscope being normally blanked or off. An output pulse applied at the Z terminal 29 causes a spot of light to appear on the oscilloscope screen at a position determined by the X and Y input signals from mixing network 18.

Output pulses from the left and right photomultiplier tubes 23 and 24 are also applied to left and right discriminators 31 and 32 respectively. When a pulse is applied to the left discriminator 31, a negative, flat-topped stereo pulse of fixed amplitude is produced as represented by a waveform 33 in the drawing. Similarly, an input pulse applied to the positive discriminator 32 results in the production of a positive, flat-topped stereo pulse of fixed amplitude as represented by a waveform 34. The output pulses from the discriminators 31 and 32 are both applied to X input terminal 15 of the oscilloscope. The quiescent values of the X and Y position signals normally direct the oscilloscope 19 electron beam toward the center of the screen 25.

In the operation of the invention, a positron annihilation occurring at area 12 may result in the emission of oppositely-directed gamma rays as indicated by arrows 36 and 37. Gamma ray 36 strikes the scintillator 16 and causes a spot of light 43, the position of which is represented by the amplitudes of resultant X and Y position signals from mixing network 18. The opposite gamma ray 37 causes an output pulse from the left photomultiplier tube 23 and the resultant negative stereo signal 33 is added to the X position signal, causing the electron beam in the oscilloscope 19 to be deflected toward the left portion of oscilloscope screen 25 to create an image 41 corresponding to the viewpoint from the left photomultiplier tube 23.

A subsequent pair of gamma rays 38 and 39 from area 12 will cause a positive pulse 34 to be combined with the X position signal, causing the oscilloscope 19 electron beam to be shifted toward the right side of the screen 25 to create an image 42. Owing to the stereoscopic effect, the images formed by gamma rays originating from area 13 will have a differing spatial relationship than the images formed by gamma rays from area 12. Thus, a stereo image pair 41 and 42 will be produced.

It should be noted that the stereo images 41 and 42 will be formed over a time period as a result of many positron annihilations. Therefore, the oscilloscope 19 may be of the type which has a memory, that is, it retains an image on the screen 25 for as long a time period as described, allowing a composite image to be built up. If desired, a conventional oscilloscope may be used with a camera 44 set for a time exposure to record the individual events. In either case, the final stereo images can be viewed in a conventional stereo viewer to obtain an impression of depth.

Numerous variations are possible in the realization of the invention. For instance a single discriminator circuit may be utilized for deflecting the electron beam in the oscilloscope to a displaced location for only one of the images.

Thus while the invention has been disclosed with respect to a particular embodiment, it will be apparent to those skilled in the art that numerous variations and modifications may be made within the spirit and scope of the invention and thus it is not intended to limit the invention except as defined in the following claims.

What is claimed is:

1. In a camera for visibly indicating the locations of positron annihilations within a subject, the combination comprising a gamma ray image detector of the type providing image output signals corresponding to the location at which gamma rays impinge thereon, said gamma ray image detector being disposed at a first side of said subject, spaced apart first and second gamma ray collimating detectors, said collimating detectors being spaced apart on the opposite side of said subject from said image detector, image reproducing means receiving said image output signals and providing a first image upon receipt of concurrent signals from said first collimating detector and said image detector and providing a second separate image upon receipt of concurrent signals from said second collimating detector and said image detector whereby a stereo view of said positron annihilations is obtained.

2. In a radiation detecting camera responsive to gamma rays emanating from a subject, the combination comprising a first scintillator sensitive to gamma rays and disposed adjacent said subject, a scintillation detector disposed adjacent said first scintillator and being of the type providing position signals indicative of the spatial location of scintillations in said first scintillator, a collimating second scintillator disposed on the opposite side of said subject from said first scintillator, collimating third scintillator spaced a short distance from said second collimating scintillator, means recording said position signals when a scintillation is produced simultaneously in said second collimating scintillator and said first image scintillator, said recording means separately recording said position signals when a scintillation is produced simultaneously in said third collimating scintillator and said first image scintillator.

3. In a camera for forming stereo images from oppositely directed gamma rays resulting from positron annihilation in a subject, the combination comprising a flat gamma ray image detecting sctintillator disposed to face said subject and intercept gama rays therefrom, a scintillation detecting means viewing said scintillator and being of the type providing output signals corresponding to the spatial location of scintillations in said scintillator, a pair of spaced apart collimating scintillators disposed adjacent said subject on the opposite side thereof from said flat image scintillator, a first and second photosensitive means each viewing a separate one of said collimating scintillators and providing first and second stereo control signals in response to scintillations in separate ones of said collimating scintillators, image reproducing means receiving said scintillation location output signals from said scintillation detecting means, said image reproducing means being adapted to provide a first image when said image signals are coincident with said first stereo control signals and to provide a second spaced apart image when said image signals are coincident with said second stereo control signals, and means storing said first and second images.

4. A stereo camera as described in claim 3, wherein said output signals from said scintillation detecting means are X and Y position signals corresponding to the rectangular coordinates of the location of a scintillation in said flat scintillator.

5. A stereo camera as described in claim 3, and comprising the further combination of a pulse height discriminator connected to the combined outputs of said photosensitive means and of the class passing only electrical pulse signals exceeding a pre-selected minimum value, and a coincidence circuit receiving the combined output of said scintillation detecting means at a first input terminal and receiving output signals from said pulse height discriminator at a second input terminal and wherein said image reproducing means receives output signals from said coincidence circuit, and a blanking circuit in said image reproducing means rendering said reproducing means normally insensitive to said spatial location signals except upon receipt of a coincidence signal from said coincidence circuit.

6. In a stereo camera for producing a visible image from gamma ray emissions from position annihilation in a subject, the combination comprising a sheet of scintillation material responsive to gamma radiation, an array of photosensitive devices viewing said scintillation material, a mixing network receiving output signals from said photosensitive array to provide an intensity signal for a scintillation and a pair of image position indicating signals therefor, a first collimating gamma ray detector and a spaced apart second collimating gamma ray detector, said gamma ray detectors and said sheet of scintillation material being spaced apart to provide a space therebetween for disposition of said subject, a first and a second photosensitive device viewing said first and said second gamma ray detectors respectively, a mixer circuit coupled to the outputs of said first and said second photosensitive devices, a coincidence circuit receiving an output signal from said mixer circuit and receiving said intensity signal and producing an output signal upon a coincidence therebetween, an oscilloscope having a beam intensity signal terminal receiving said output signals from said coincidence circuit as a beam unblanking signal and having beam deflection terminals receiving said image position signals, discriminator means receiving the outputs of at least one of said first and said second photosensitive devices and providing at least one beam positioning signal to at least one of said beam deflection terminals, and recording means for storing images created by said oscilloscope.

7. A stereo camera as described in claim 6, wherein said discriminator means provides a beam positioning signal of a first polarity to said beam deflection terminals of said oscilloscope when a signal is received from said first photosensitive device, and wherein said discriminator means provides a beam positioning signal of a second polarity to said deflection terminals when a signal is received from said second photosensitive device.

8. In a radiation sensitive camera for determining the location in a subject of nuclear events of the type simultaneously emitting two gamma rays in opposite directions, the combination comprising a first quantity of scintillation material disposed proximal said subject, a plurality of phototubes viewing said first material, a mixing network receiving the outputs of said phototubes and deriving X axis and Y axis signals proportional to the location of a scintillation in said scintillation material, means deriving a summation signal proportional to the amplitude of light in said first quantity of scintillation material, an oscilloscope receiving said X and Y axis signals and having a beam intensity control, a second and a third quantity of spaced apart scintillation materials adapted to be disposed on the opposite side of said subject from said first quantity of scintillation material, a first and a second light responsive phototube viewing said second and said third quantities of scintillation material respectively, a coincidence circuit receiving said summation signal and the combined outputs of said second and third phototubes and having an output connected to said beam intensity control of said oscilloscope, a first discriminator responsive to an output signal from said first phototube and providing a resultant negatively polarized fixed amplitude X axis position signal to said oscilloscope, and a second discriminator responsive to an output signal from said second phototube and providing a resultant positively polarized fixed amplitude X axis position signal to said oscilloscope whereby two spaced apart stereo views of said nuclear events are produced by said oscilloscope.

9. A radiation camera as described in claim 8 wherein a photographic camera records a plurality of scintillation images appearing on said oscilloscope over a time interval whereby permanent composite stereo images are provided.

References Cited
UNITED STATES PATENTS 3,011,057 11/1961 Anger _____ 250—71.5
3,255,352 6/1966 Johnston _____ 250—71.5

RALPH G. NILSON, *Primary Examiner.*

A. L. BIRCH, *Assistant Examiner.*